US006909048B2

(12) United States Patent
Yamanaka et al.

(10) Patent No.: US 6,909,048 B2
(45) Date of Patent: Jun. 21, 2005

(54) CONNECTING APPARATUS, IMAGE SCANNING APPARATUS, AND IMAGE FORMING SYSTEM

(75) Inventors: Hisashi Yamanaka, Yamatokoriyama (JP); Makoto Masuda, Nara (JP); Sohichi Takata, Kitakatsuragi-gun (JP); Yasuhiro Ono, Soraku-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/849,377

(22) Filed: May 20, 2004

(65) Prior Publication Data

US 2004/0238199 A1 Dec. 2, 2004

(30) Foreign Application Priority Data

May 27, 2003 (JP) ....................................... 2003-149743

(51) Int. Cl.⁷ .............................. F16L 3/08; H02G 3/04

(52) U.S. Cl. .................. 174/68.1; 174/72 A; 174/72 C; 174/135; 248/65

(58) Field of Search ............................... 174/68.1, 68.3, 174/69, 70 A, 70 C, 70 R, 72 A, 72 C, 73.1, 96, 97, 98, 99 R, 135, 136; 439/719; 191/22 R, 23 R; 296/146.7; 248/65, 74.1, 74.4

(56) References Cited

U.S. PATENT DOCUMENTS

| | | | | |
|---|---|---|---|---|
| 6,079,764 A | * | 6/2000 | Suzuki et al. | 296/146.1 |
| 6,095,461 A | * | 8/2000 | Daoud | 248/65 |
| 6,105,216 A | * | 8/2000 | Opperthauser | 24/459 |
| 6,135,398 A | * | 10/2000 | Quesnel | 248/74.1 |
| 6,293,504 B1 | * | 9/2001 | Hartmann | 248/74.1 |
| 6,534,713 B2 | * | 3/2003 | Kafer | 174/72 A |
| 6,700,064 B2 | * | 3/2004 | Aoki et al. | 174/69 |

FOREIGN PATENT DOCUMENTS

| | | |
|---|---|---|
| JP | 10-126943 | 5/1998 |
| JP | 10-255456 | 9/1998 |
| JP | 11-219232 | 8/1999 |
| JP | 2000-267206 | 9/2000 |
| JP | 2002-90711 | 3/2002 |

* cited by examiner

*Primary Examiner*—Dean A. Reichard
*Assistant Examiner*—Adolfo Nino
(74) *Attorney, Agent, or Firm*—Nixon & Vanderhye P.C.

(57) ABSTRACT

A connecting apparatus of the present invention includes a cable used for electrically connecting an apparatus main body section to a section rotatably supported by a hinge member with respect to said apparatus main body section, wherein the cable is provided in parallel to a rotation axis of the hinge member so as to be held by the apparatus main body section and the section, respectively, and the cable has a half-loop shape. Because the cable is provided in parallel to a rotation axis of the hinge member so as to be held by the apparatus main body section and the section, respectively, the torsional stress is dispersed in the half-loop of the cable when the cable is twisted by a rotation of the section rotatably supported. On this account, the stress is not concentrated, thereby reducing the stress applied to the cable, and improving a durability of the cable.

19 Claims, 11 Drawing Sheets

CONNECTING APPARATUS, IMAGE SCANNING APPARATUS, AND IMAGE FORMING SYSTEM

This Nonprovisional application claims priority under 35 U.S.C. § 119(a) on patent application Ser. No. 2003/149743 filed in Japan on May 27, 2003, the entire contents of which are hereby incorporated by reference.

FIELD OF THE INVENTION

The present invention relates to (i) a connecting apparatus electrically connecting an apparatus main body to a peripheral apparatus that can rotate with respect to the apparatus main body, (ii) an image scanning apparatus including the connecting apparatus, and (iii) an image forming system including the connecting apparatus. In particular, the present invention relates to (i) a connecting apparatus connecting, for example, an optical scanning apparatus which serves as the apparatus main body to an original document feeding apparatus which is provided at an upper part of the optical scanning apparatus and serves as the peripheral apparatus, (ii) an image scanning apparatus including the connecting apparatus, and (iii) an image forming system including the connecting apparatus.

BACKGROUND OF THE INVENTION

In recent years, an image forming apparatus such as a printer has included an original document feeding apparatus which automatically feeds a sheet-like original document to an image scanning apparatus so that the image forming apparatus sequentially scans the original document. The original document feeding apparatus efficiently ensures image scanning and image forming, respectively.

The image scanning apparatus includes, for example, (i) an optical scanning apparatus provided in an apparatus main body and (ii) the original document feeding apparatus, provided at an upper part of the optical scanning apparatus, for feeding the original document to the optical scanning apparatus. The original document feeding apparatus is, for example, rotatably provided with respect to the optical scanning apparatus, and serves as an openable and closable original cover unit.

Both sides of the original document that is fed by the original document feeding apparatus can be scanned by the optical scanning apparatus and a contact image scanning sensor that is provided in the original document feeding apparatus, respectively. An original document, such as a book-like original document, which cannot be fed by the original document feeding apparatus is scanned in accordance with conventional ways. Namely, the original document is placed on a platen glass of the optical scanning apparatus, and the original document feeding apparatus is rotated so as to cover the original document—that is, the original document feeding apparatus functions as an original cover unit at this moment—, and then, the original document is scanned.

A progress in a digital technique demands a higher speed processing and larger volume on the image scanning apparatus. More specifically, the image scanning apparatus is required to carry out, faster, the scanning of the original document, the conversion into electronic data, or the image forming based on the electronic data. This causes the original document feeding apparatus to handle a larger number of original documents. Accordingly, a greatly larger number of original documents—for example, 100 through 200 sheets of the original documents—are set at a time in the original document feeding apparatus so that a larger number of original documents can be dealt with at a high speed. Also, a progress in the original document feeding apparatus of the image scanning apparatus allows the original document feeding apparatus to feed various types of original documents.

When a large number of sheet-like original documents that are to be fed are stacked, like bundle of original documents, on the original document feeding apparatus, the original documents are fed one by one from top to bottom of the bundle. This is because it is difficult to feed the original documents from bottom due to the weight of the bundle of the stacked original documents. When the height of the bundle changes in response to the feeding of the original documents, the height of a tray on which the original documents are stacked is controlled in accordance with the change of the height of the bundle. For this controlling, a motor (which serves as a drive source), a plurality of detectors, and the like, are provided in the original document feeding apparatus.

Therefore, in order to supply electric power to the original document feeding apparatus, the optical scanning apparatus and the original document feeding apparatus are connected with each other by an electric cable.

In a conventional art, when the optical scanning apparatus and the original document feeding apparatus are connected by the electric cable, the electric cable is disposed at the rear of the image forming apparatus so that the electric cable is hard to be seen by a user. This is because it is better in appearance for the electric cable to be disposed in an area where the electric cable is seen by the user to a least possible degree. Generally, the electric cable is disposed in an area where a hinge member is provided at the rear of the image forming apparatus.

For example, a connecting apparatus disclosed in Japanese Laid-Open Patent Application Tokukaihei 10-255456/1998 (published on Sep. 25, 1998) and a original cover of an image forming apparatus disclosed in Japanese Laid-Open Patent Application Tokukai 2000-267206 (published on Sep. 29, 2000) are so arranged that an electric cable is placed at the rear of an apparatus main body as described above.

An electric cable is also provided at the rear of an apparatus main body in the form of a sheet-like electric cable, for example, in (i) a packaging structure of a connecting member in a hinge section,—the structure is disclosed in Japanese Laid-Open Patent Application Tokukaihei 10-126943/1998 (published on May 15, 1998)—, and (ii) an electronic apparatus disclosed in Japanese Laid-Open Patent Application Tokukaihei 11-219232/1999 (published on Aug. 10, 1999).

However, there is a problem that the electric cable is easily damaged in cases where the electric cable is placed behind an original document feeding apparatus which is designed to be opened and closed from its front side.

That is, for example, in cases where a connecting is carried out so that the electric cable is placed in a direction orthogonal to an axis of rotation of the hinge, or so that the electric cable is provided in a looped and projecting manner, opening and closing operations cause the electric cable to receive bending stress. Therefore, the electric cable receives the bending stress that increases in proportion to the number of the opening and closing operations. This may cause a trouble, for example, such as a breaking of wire in the electric cable.

SUMMARY OF THE INVENTION

An object of the present invention is to provide (i) a connecting apparatus which reduces bending stress exerted on an electric cable so that a total stress exerted on the electric cable is reduced, (ii) an image scanning apparatus including the connecting apparatus, and (iii) an image forming system including the connecting apparatus.

To achieve the object, a connecting apparatus of the present invention includes a cable for electrically connecting an apparatus main body section to a section rotatably supported by a hinge member with respect to the apparatus main body section, wherein: the cable is provided in parallel to a rotation axis of the hinge member so as to be held by the apparatus main body section and the section, respectively, and the cable has a half-loop shape.

According to the arrangement, the cable is provided in parallel to the rotation axis of the hinge member so as to be held by the apparatus main body section and the section, respectively, and the cable has a half-loop shape. This allows the torsional stress to be distributed to the half-loop part of the cable, when the cable is twisted due to a rotation of the section rotatably supported by a hinge member.

On this account, the stress is not concentrated on a particular portion of the cable, thereby reducing the stress of the cable, and improving a durability of the cable.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 3(*b*) is a perspective view illustrating the image forming system in a different state from a state shown in FIG. 3(*a*).

FIG. 7(*b*) is a plane view illustrating another part of the connecting apparatus is in a different state from a state shown in FIG. 7(*a*).

FIG. 12(*b*) is a plane view illustrating the connection structure of the image scanning apparatus is in a different state from a state shown in FIG. 12(*a*)

DESCRIPTION OF THE EMBODIMENTS

One embodiment of the present invention will be described below with reference to FIG. 1 through FIG. 9.

Figure 2:
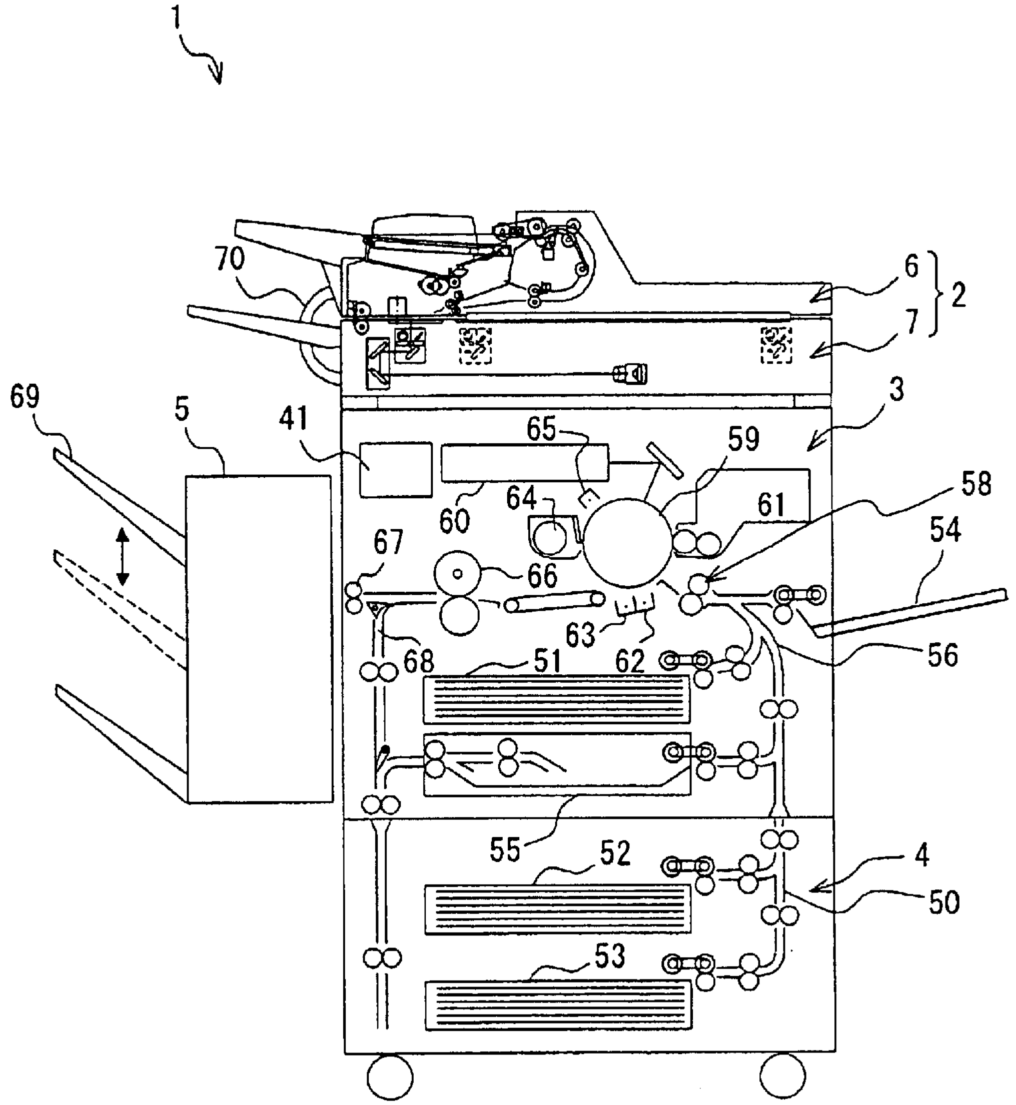
FIG. 2 is a perspective view schematically illustrating an image forming system including the image scanning apparatus.

A multifunctional apparatus (image forming system) 1 of the present embodiment, as schematically shown in FIG. 2, includes an image scanning apparatus (sheet feeding apparatus) 2, an image forming apparatus 3, a sheet supplying apparatus 4, and a post-process apparatus 5. The image scanning apparatus 2 is provided in an upper part of the multifunctional apparatus 1. The image forming apparatus 3 is provided under the image scanning apparatus 2. The sheet supplying apparatus 4 is provided under the image forming apparatus 3. The post-process apparatus 5 is provided on a side of the image forming apparatus 3.

The image scanning apparatus 2 scans an image on an original document (sheet). The image forming apparatus 3 prints the image scanned by the image scanning apparatus 2 on paper (sheet). The image forming apparatus 3 also can print on the sheet an image data supplied from outside of the multifunctional apparatus 1 via an interface (not shown). The sheet supplying apparatus 4 stores sheets and supplies the sheets to the image forming apparatus 3. The post-process apparatus 5 carries out a post-process, such as a stapling process, to the sheet printed by the image forming apparatus 3.

The following description deals with (i) how the image scanning apparatus 2 scans the original document, and (ii) how the image forming apparatus 3 carries out a printing.

As schematically shown in FIG. 2, the image scanning apparatus 2 includes (i) an automatic document feeder (ADF) (sheet feeding apparatus; rotating section) 6 at the upper part of the apparatus main body, and (ii) an optical scanning section (main body section) 7 at a lower part of the apparatus main body. The image forming apparatus 2 can scan images on both sides of an original document with the use of a CCD (charge coupled device) scanning unit provided in the optical scanning section 7 and a scanning section (CIS (contact image sensor)) provided at a part of the ADF 6.

The image scanning apparatus 2 has three scanning modes; a manual scanning mode, a single-sided automatic scanning mode, and a double-sided automatic scanning mode. When the manual scanning mode is selected, an original document such as a book is placed on an original platen of the optical scanning section 7, and the optical scanning section 7 scans an image of the original document. When the single-sided automatic scanning mode or the double-sided automatic scanning mode is selected, original documents stacked in an original document tray are automatically fed one by one by the ADF 6 and an image of each of the original documents is scanned. In the single-sided automatic scanning mode, the original document is scanned by the optical scanning section 7. In the double-sided automatic scanning mode, the original document is scanned by the optical scanning section 7 and the CIS, respectively. Detail about the image scanning apparatus 2 will be explained later.

Figure 3:
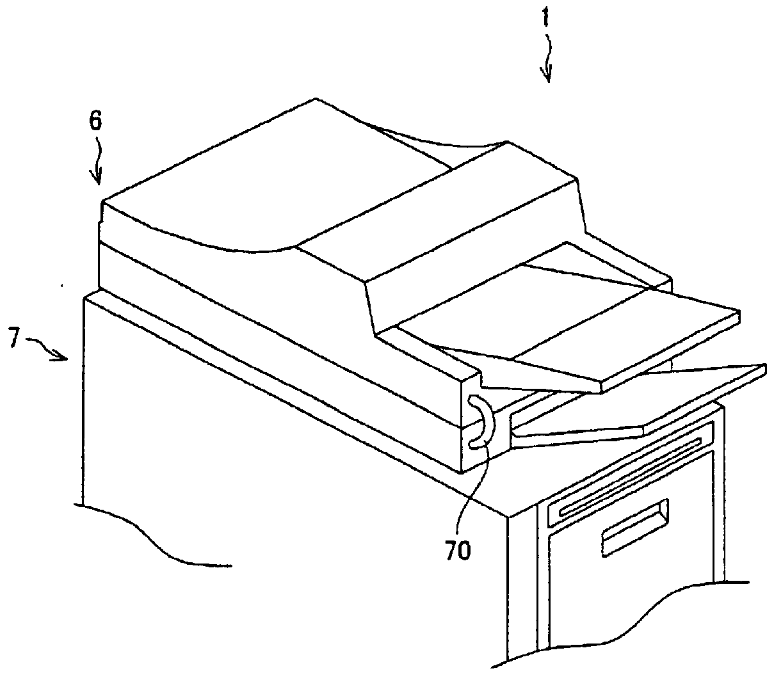
FIG. 3(*a*) is a perspective view illustrating the image forming system.
Figure 3:
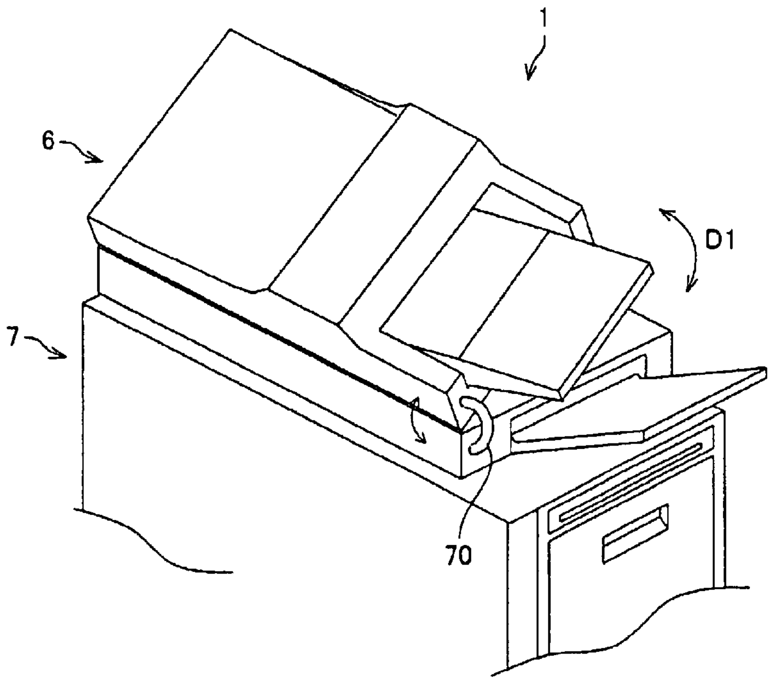

As shown in FIG. 3(*a*), in the image scanning apparatus 2 of the present embodiment, the ADF 6 and the optical scanning section 7 are connected with each other by a bundle of electric cables (hereinafter referred to as an electric cable bundle) covered with a bundling tube 70. The electric cable bundle covered with the bundling tube 70 is disposed on a side of the image scanning apparatus 2. On this account, the user can see the electric cable bundle when the user stands in front of the image scanning apparatus 2.

Figure 1:
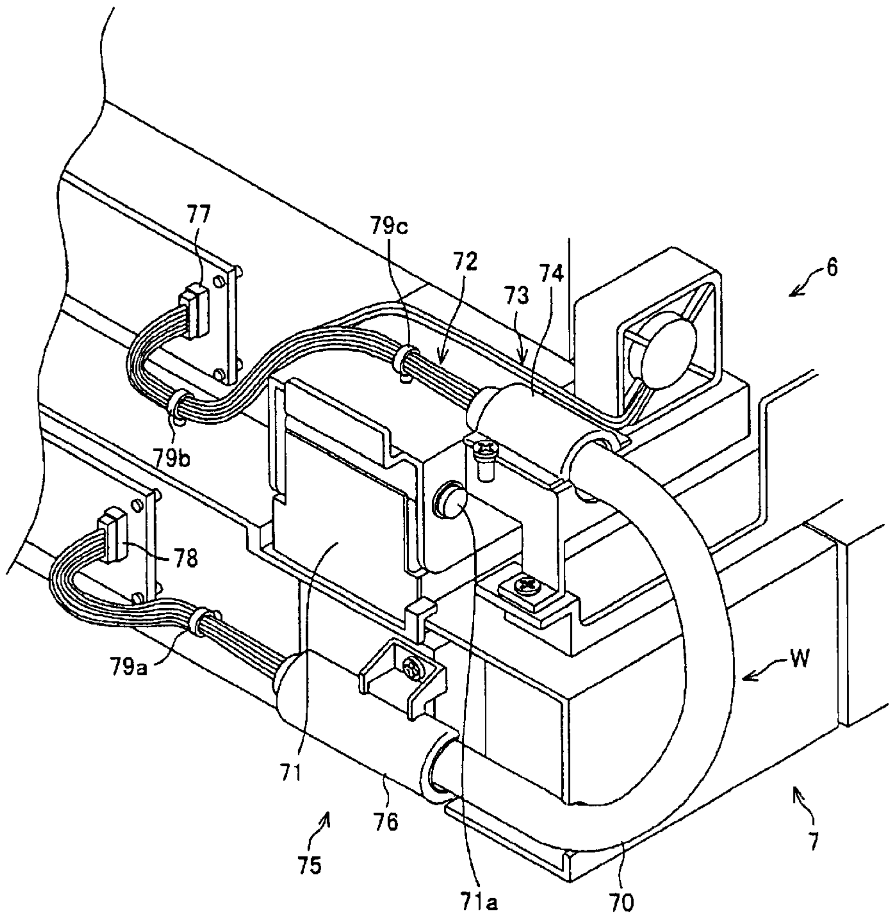
FIG. 1 is a perspective view illustrating a part of an image scanning apparatus including a connecting apparatus of the present invention.

In the manual scanning mode, as shown in FIG. 3(*b*), the ADF 6 is rotated in a direction indicated by an arrow D1, and the original document is placed on the original platen of the optical scanning section 7, and then, the image of the original document is scanned. For this end, as shown in FIG. 1, the ADF 6 is supported by a hinge 71 of the optical scanning section 7 so as to be rotatable around an axis 71*a* of rotation (hereinafter referred to as a rotation axis 71*a*). Note that FIG. 1 partially shows the ADF 6 and the optical scanning section 7, and that the ADF 6 is also supported by the optical scanning section 7 via another hinge (not shown).

Figure 4:
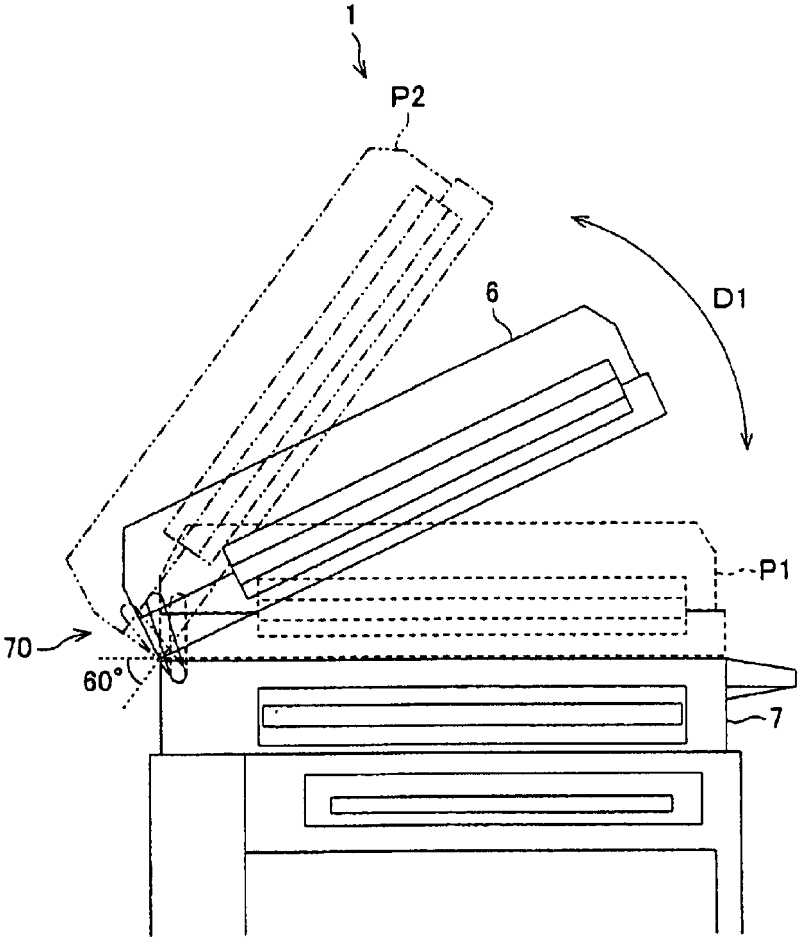
FIG. 4 is a side view illustrating the image forming system.

In the single-sided automatic scanning mode or the double-sided automatic scanning mode, as shown in FIG. 4, the ADF 6 is rotated to a position indicated by a symbol P1. Thereafter, original documents are fed one by one by the ADF 6, and an image of each of the original documents is scanned. On the contrary, in the manual scanning mode, the ADF 6 is rotated to a position indicated by a symbol P2. Then, the original document is placed on the original platen of the optical scanning section 7, and an image of the original document is scanned. In the present embodiment, the ADF 6 can be rotated within an angle of 60° as shown in FIG. 4. However, the present invention is not limited to this. Namely , the rotation angle of the ADF 6 may be wider.

Incidentally, as shown in FIG. 1, the ADF 6 and the optical scanning section 7 are connected with each other by an electric cable bundle (cable) 72. The electric cable bundle 72 is a bundle of approximately sixty insulating coating cables. The electric cable bundle 72 is covered with the bundling tube 70. The bundling tube 70 is a vinyl tube for electrical insulation (for example, the EXLON (registered trademark)—PVC UL tube or the like). Note that the arrangement of the bundling tube 70 is not limited to this.

The ADF 6 includes a connector (second connector) 77, to which the electric cable bundle 72 is connected. The optical scanning section 7 also includes a connector (first connector) 78, to which the electric cable bundle 72 is connected.

The electric cable bundle 72 is not firmly supported by respective chassis of the ADF 6 and the optical scanning section 7, via a holding section (second holding section) 73 of the ADF 6 and a holding section (first holding section) 75 of the optical scanning section 7, respectively. That is, the electric cable bundle 72 is supported so as to be rotatable in the holding sections 73 and 75, respectively, even when the electric cable bundle 72 is twisted. The holding section 73 of the ADF 6 and the holding section 75 of the optical scanning section 7 are provided substantially parallel to the rotation axis 71*a*, and support the electric cable bundle 72 horizontally so as to be parallel to the rotation axis 71*a*. Between the holding sections 73 and 75, the electric cable bundle 72 covered with the bundling tube 70 bends in a U-shape so as to have a curve section W. A curvature radius of the curve section W is approximately 75 mm.

Thus, the holding sections 73 and 75 hold the curve section W. Accordingly, even when a twisting occurs in the bundling tube 70 and the electric cable bundle 72 in the curve section W, the twisting can be absorbed by the curve section W and by the holding sections 73 and 75, respectively. This can prevent the twisting from occurring in a particular place.

Note that the holding section 73 less moves while the ADF 6 rotates. This is because the holding section 73 is disposed in the vicinity of the rotation axis 71*a*. On this account, the curve section W is less twisted. Note that the arrangement of the holding section 73 of the ADF 6 is not limited to this, but may be disposed so as to be parallel to the rotation axis 71*a*.

Furthermore, between the connector 78 and the holding section 75, the electric cable bundle 72 is partially attached to the chassis of the optical scanning section 7 by a bundling member 79*a*. In like manner, between the connector 77 and the holding section 75, the electric cable bundle 72 is partially attached to the chassis of the ADF 6 by bundling members 79*b* and 79*c*. Because the electric cable bundle 72 is thus partially attached to the respective chassis, it is possible to improve the stability of the connection between the connector 77 and the connector 78. Note that the number and the positions of the bundling members are not limited to this. Note also that the arrangement of the bundling members is not limited to the arrangement shown in FIG. 1, but other different arrangements may be replaced therewith.

As described above, the arrangement for connecting the electric cable bundle 72 between the connector 77 and the connector 78 functions as a connecting apparatus which connects the ADF 6 to the optical scanning section 7.

Here, the holding section 73 includes a supporting member (second supporting member) 74, and the holding section 75 includes a supporting member (first supporting member) 76. The supporting members 74 and 76 have a similar structure, therefore, for ease of explanation, the structure of the supporting member 76 is only explained here. As such, an explanation about the supporting member 74 is omitted here.

Figure 5:
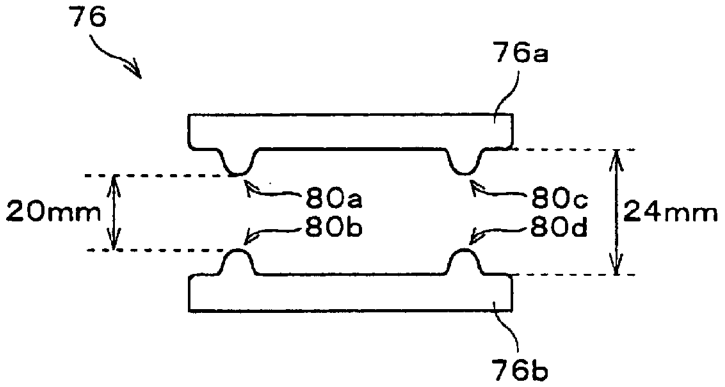
FIG. 5 is a cross sectional view illustrating a part of the connecting apparatus.

FIG. 5 is a cross sectional view illustrating the supporting member 76 in a thrust direction (in such a direction that the electric cable bundle extends). As shown in FIG. 5, the supporting member 76 has two-division structure including halved members 76*a* and 76*b*. The supporting member 76 is a cylindrical resin member whose inner wall has a curvature. Specifically, the supporting member 76—that is, the halved members 76*a* and 76*b*—is formed by a metal mold with the use of a resin material having high flame resistance such as the ABS resin (having higher flame resistance than UL94-V2 flame resistance).

Inside the supporting member 76, rib sections 80*a*, 80*b*, 80*c*, and 80*d* are formed. Specifically, rib sections 80*a* and 80*c* are provided on the halved member 76*a*, and rib sections 80*b* and 80*d* are provided on the halved member 76*b*. Each surface of the rib sections 80*a* through 80*d* has a curvature and a high flame resistance, thereby decreasing, to the utmost, damage on the electric cable bundle 72. Also, the supporting member 76 has inlet/outlet for the electric cable bundle 72, the inlet/outlet also having a surface with a curvature.

When the halved members 76*a* and 76*b* are combined with each other, the supporting member 76 has a diameter of 24 mm and the bore diameter between the rib sections 80*a* and 80*b* is 20 mm. Further, the bundling tube 70 covering the electric cable bundle 72 has a diameter of 19 mm. Namely, the bore diameter between the rib section 80*a* and 80*b*, and the bore diameter between the rib section 80*c* and 80*d* are larger than the diameter of the bundling tube 70.

Therefore, according to the electric cable bundle 72, frictional force occurs, due to the contactings, at the rib sections 80*a* through 80*d* and the inlet/outlet of the supporting member 76, respectively. However, the electric cable 72 has received no damage because the rib sections 80*a* through 80*d* and the supporting member 76 have curvatures in the respective surfaces as described above. Note that the supporting member 76 and the bundling tube 70 are not limited to these arrangements, respectively.

Figure 6:
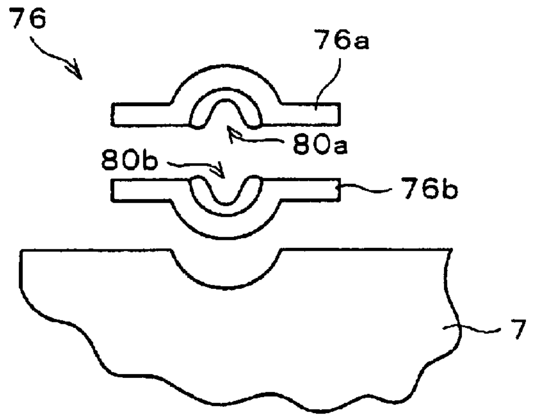
FIG. 6 is a cross sectional view illustrating a part of the connecting apparatus when viewing from a different direction from FIG. 5.

FIG. 6 is a cross sectional view illustrating the supporting member 76 in a direction perpendicular to the thrust direction. As shown in FIG. 6, the halved members 76*a* and 76*b*, which constitute the two-division structure of the supporting member 76, are attached to the optical scanning section 7. The bundling tube 70 covering the electric cable bundle 72 can be not firmed held by the halved members 76*a* and 76*b* and by the rib sections 80*a* through 80*d*, these members and sections having curved surfaces, respectively. That is, the electric cable bundle 72 is gently caught by the half-supporting members 76*a* and 76*b* and the rib sections 80*a* through 80*d*, while the bundling tube 70 covers the electric cable bundle 72. Note that the halved members 76*a* and 76*b* can be attached to and detached from the optical scanning section 7. Note also that the positions of the rib sections 80*a* through 80*d* are not limited to those described above, and that the rib sections 80*a* through 80*d* may be provided anywhere in the supporting member 76. For example, they may be provided near an edge of the supporting member 76 or in the middle of the supporting member 76. Alternatively, they may be more provided than the number of the above-described case.

Figure 7:
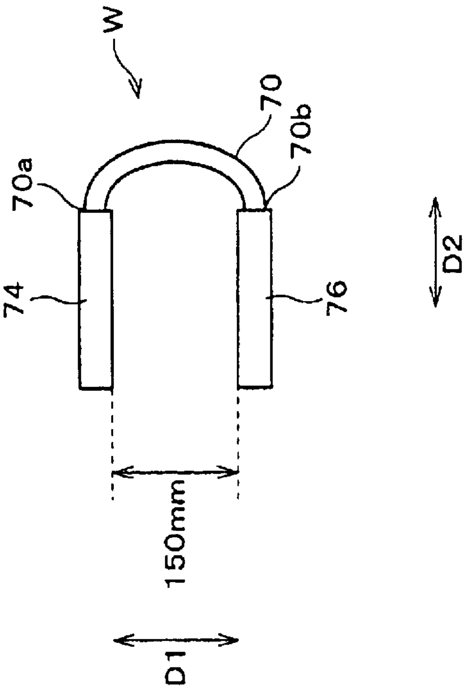
FIG. 7(*a*) is a plane view illustrating another part of the connecting apparatus.
Figure 7:
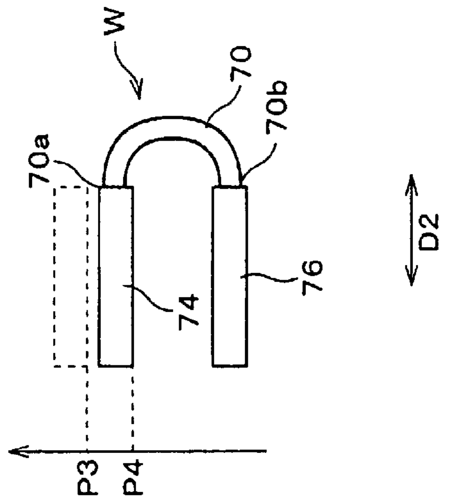

The following description deals with how the electric cable bundle 72 and the bundling tube 70 change in respective shapes when the ADF 6 is rotated, with reference to FIG. 7(*a*) and FIG. 7(*b*).

FIG. 7(*a*) is a plane view schematically illustrating the electric cable bundle 72 when the ADF 6 is closed. On this occasion, the distance between the supporting member 74 and the supporting member 76 is approximately 150 mm, and the curvature radius of the curve section W is approximately 75 mm, which is one half of the distance between the supporting member 74 and the supporting member 76. Note that the curvature radius of the curve section W is not limited to this.

See FIG. 7(*b*). When the ADF 6 is opened, the supporting member 74 is moved, in a direction indicated by D1, from a position indicated by a symbol P3 to a position indicated by a symbol P4. As described above, in the present embodiment, irrespective of whether the ADF is opened or closed, an imaginary line that connects one edge 70*a* of the curve section W to the other edge 70*b* of the curve section W is orthogonal to (i) the rotation axis 71*a* of the ADF 6 and (ii) the direction (the thrust direction D2) in which the electric cable bundle 72 extends in the supporting members 74 and 76.

On this account, the force produced between the edges 70*a* and 70*b* of the curve section W has no component force in the thrust direction D2 of the supporting members 74 and 76. Accordingly, the electric cable bundle 72 does not move in the thrust direction.

Thereinafter, detail about the image scanning apparatus 2 and its scanning operation is explained.

Figure 8:
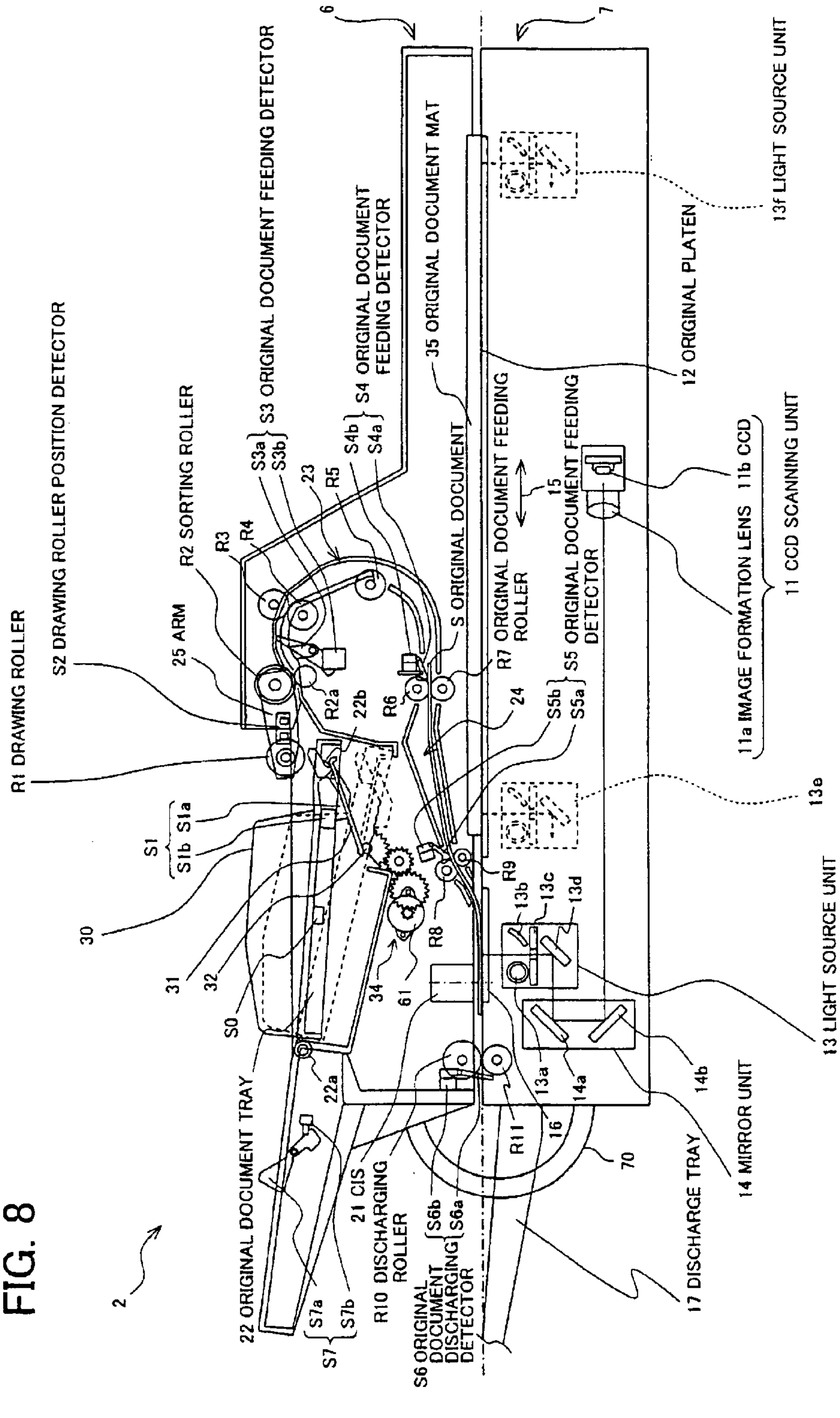
FIG. 8 is a cross sectional view illustrating the image scanning apparatus.

As shown in FIG. 8, the ADF 6 feeds original documents from an original document tray 22 provided at the upper part of the ADF 6, via a feeding path around which rollers R2 through R9 are provided for feeding the original document, to an image scanning area (processing area) where an image scanning is carried out by the optical scanning section 7 and the CIS 21. In the optical scanning section 7, via a light source unit 13 and a mirror unit 14, a CCD scanning unit 11 scans an image on one side of each original document fed by the ADF 6. The CIS 21 provided in the ADF 6 scans an image on the other side of the original document. The following description deals with (i) how the original document is fed by the ADF 6 in the single-sided automatic scanning mode and the double-sided automatic scanning mode, (ii) how a control operation is carried out during the feeding, and (iii) how an image scanning is carried out in the image scanning area, in this order.

The ADF 6 mainly includes (i) the feeding path used for feeding the original document, and (ii) the original document tray 22. Around the feeding path, the rollers R2 through R10, which serve as feeding means for feeding the original document, are disposed.

The feeding path includes (i) a feeding area in which the original documents are fed and (ii) the image scanning area in which each of the original documents is subjected to an image scanning processing. Here, the feeding area corresponds to, for example, a continuing area between the roller R2 and the rollers R8 and R9. The image scanning area where an image scanning is carried out extends, in a direction in which the original document is fed, from the rollers R8 and R9 toward downstream. The feeding path in the ADF 6 includes a curve section 23 where the feeding direction of the original document changes.

The original document tray 22 of the ADF 6 is an electric motor-driven tray, and includes an original document detector S1. The original document detector S1 is an optical original document detector including an actuator S1*a* and a sensor main body S1*b*. The original document detector S1 detects whether or not an original document is set in the original document tray 22.

The ADF 6 includes a drawing roller R1 at the upper part of the original document tray 22. The drawing roller R1 is supported by an arm 25 provided in the chassis of the ADF 6 so as to move up and down. The arm 25 is rotatably supported by a rotation axis of a sorting roller R2 that is provided around the feeding path of the ADF 6. A weight of the drawing roller R1 brings the drawing roller R1 into a contact with the top original document of the original documents. A stopper (not shown) prevents the drawing roller R1 from moving down beyond a predetermined position—in other words, more than necessary.

The ADF 6 includes a drawing roller position sensor S2 for detecting a displacement of the drawing roller R1, and is constituted by an optical sensor or the like. The drawing roller position detector S2 detects a rocking angle of the arm 25 in response to a convex section (not shown) formed in the arm 25 so as to find a height of the drawing roller R1 from the rocking angle of the arm 25. Note that the drawing roller position detector S2 is not limited to the arrangement in which the drawing roller position detector S2 detects the height of the drawing roller R1 by utilizing the convex section formed in the arm 25. For example, the drawing roller position detector S2 may be provided so as to be away from the arm 25, and a rotatable joint section coupled on the arm 25 is provided, and the drawing roller position detector S2 detects the height of the drawing roller R1 by utilizing the rotatable joint section.

The original document tray 22 of the ADF 6 includes an original document regulating board 30 which aligns sides of the original documents and regulates a position of the original documents to be stacked. The original document tray 22 further includes a first original document size detector S0 and a second original document size detector S7. The first original document size detector S0 detects the position of the original document positioning board 30, so as to detect a width of the original documents (a length in a direction orthogonal to the feeding direction of the original documents). The second original document size detector S7 includes an actuator S7*a* and a sensor main body S7*b*. The second original document size detector S7 detects a length of the original documents (a length in the feeding direction of the original documents). It is possible to identify the size of the original document stacked on the original document tray 22 in accordance with the results respectively detected by the first original document size detector S0 and the second original document size detector S7. This allows the multifunctional apparatus 1 to select at least desirable size of sheet to be used for the image forming.

Upon receipt of the original document(s), the original document tray 22 starts to move up at a predetermined timing. When the top one of the original documents stacked on the original document tray 22 pushes up the drawing roller R1, the original document tray 22 stops in response to the drawing roller position detector S2, and is brought into a stand-by mode. After that, for example, upon receipt of an original document-feeding signal from a control section (not shown) of the multifunctional apparatus 1, the ADF 6 feeds the original documents sequentially to the feeding path. Note that, for example, in cases where the multifunctional apparatus 1 is kept being in the stand-by mode for a predetermined period of time, the original document tray 22 may temporarily be moved down to a certain position. This avoids that the drawing roller R1 changes in shape. Note that the original document tray 22 does not have to temporarily move down. Alternatively, it may keep being in the stand-by mode.

When carrying out a scanning of the original documents, the original document tray 22 is controlled by a control section (not shown) in accordance with a signal sent from the drawing roller position detector S2 such that the top one of the stacked original documents always maintains a predetermined height. The original document tray 22 includes a rib **22*b*, a lifting plate 31, and a lifting plate supporting shaft 32, which are respectively used for moving up or down. The original document tray 22 further includes a lifting mechanism section 34, and a lifting motor 61. The control section controls the rib 22*b*, provided in the bottom section of the original document tray 22, so that the rib 22*b* gets into touch with the lifting plate 31 of the lifting mechanism 34, thereby supporting the lifting plate 31. The lifting motor 61 rotates clockwise or counterclockwise. This allows the lifting plate shaft 32 to rotate via a transmission system such as gears. On this account, the lifting plate 31 is rotated, and the original document tray 22** moves up or down.

The drawing roller R1 rotates and draws the original documents. The original documents thus drawn are sorted to each individual original document by the sorting rollers R2 and **R2*a*, and then, fed one by one to the feeding path of the ADF 6. The sorting roller R2 is provided so as to face the sorting roller R2*a* having a torque limiter. On this account, even if a plurality of documents are drawn in by the drawing roller R1, the sorting rollers R2 and R2*a* allow only a top one of original documents (an original document facing the roller R2) to be fed to the feeding path, thereby ensuring the original documents to be sorted to each individual original document, and feeding the original documents one by one to the feeding path. Note that, instead of the sorting roller R2*a*, a friction pad may be provided so as to face the sorting roller R2**.

Downstream of the sorting rollers R2 and **R2*a* of the feeding path of the ADF 6 in the feeding direction of the original document, an original document feeding detector S3 is provided. The original document feeding detector S3 includes an actuator S3*a* and a sensor main body S3*b*. The original document feeding detector S3 allows judgment whether or not the original documents are fed one by one to the feeding path after being sorted to each individual original document without fail by the sorting rollers R2 and R2*a***.

Downstream of the original document feeding detector S3 of the feeding path of the ADF 6 in the feeding direction of the original document, a pair of rollers R3 and R4. Downstream of the rollers R3 and R4 of the feeding path in the feeding direction, the curve section 23 is provided. Specifically, upstream of the feeding path in the feeding direction of the original document, the rollers R3 and R4 are provided so as to be followed by the curve section 23.

The curve section 23 includes the rollers R5, R6, and R7. The curve section 23 corresponds to an area in the feeding path of the ADF 6 between (i) the rollers R3 and R4 and (ii) the rollers R6 and R7, excluding the rollers R3 through R7 themselves. In the curve section 23, the original document is fed with the use of the rollers R5, R6 and R7 to a correction area (resist skew correction area) 24.

Note that the curvature of the curve section 23 shown in FIG. 8 is set so that any kind of original documents can be stably fed. That is, the curvature of the curve section 23 is set to allow even the thickest and stiffest one of the original documents that can be scanned to be smoothly fed.

The curve section 23 further includes an original document feeding detector S4. The original document feeding detector S4 includes an actuator **S4*a* and a sensor main body S4*b*. The original document feeding detector S4 detects a discharging of the original document from the curve section 23 so as to judge whether the original document is securely fed in the curve section 23**.

The original document is fed to the correction area 24 from the curve section 23 by the rollers R6 and R7. The correction area 24 is provided before the pair of rollers R8 and R9 (resist section) so as to improve an efficiency of correcting a skew of the original document. As described above, downstream of the original document in the sheet feeding direction, the resist rollers R8 and R9 are provided so as to be away from the curve section 23.

As shown in FIG. 8, the correction area 24 is provided, for example, so that (1) an original document S is fed in a straight manner between the pair of rollers R6 and R7 and the pair of resist rollers R8 and R9, and (2) the original document S is fed as freely as possible, without touching an original document guiding member of the feeding path.

The distance between the pair rollers R6 and R7 and the pair of rollers R8 and R9 should be not less than a length (a length in the feeding direction of the original document) of the smallest original document which the ADF 6 can handle. Namely, the original document is fed in the curve section 23 so that the original document leaves less rear end part thereof in the curve section 23, thereby improving the efficiency and smoothness of correcting the skew of the original document.

The ADF 6 further includes an original document feeding detector S5 provided before the resist roller R8 and the roller R9 in the feeding direction, that is, in the vicinity of an end of the correction area 24. The original document feeding detector S5 includes an actuator **S5*a* and a sensor main body S5*b***.

When the original document is discharged from the curve section 23 to the correction area 24 and the original document feeding detector S5 detects a leading end of the original document, feeding force is applied to the original document from upstream with the use of the upstream feeding rollers including the feeding rollers R6 and R7 while stopping the resist roller R8 and the roller R9. This allows the leading end of the original document to hit against a nip section, where the resist roller R8 and the roller R9 make contact with each other, over a predetermined period of time. On this account, the skew of the original document is corrected.

After the skew correction for the original document is carried out in the correction area 24, the resist roller R8 and the roller R9 rolls at a predetermined timing so that the feeding of the original documents is resumed. The original document is fed to a first scanning area (image scanning area) where an exposure scanning is carried out by the light source unit 13 with respect to a surface (one surface) of the original document. After that, the original document is fed to a second scanning area (image scanning area) where the other surface of the original document is scanned by the CIS 21. That is, the resist roller R8 and the roller R9 resume the feeding of the original document at a predetermined timing so as to adjust a timing for feeding the original document to the image scanning area. As described above, the original document, which has been fed by the rollers R3 and R4, are fed to the image scanning area (the first scanning area) by the resist roller R8 and the roller R9, the resist roller R8 and the roller R9 serving as the resist section.

The image scanning apparatus 2 scans one surface of the original document in the first image scanning area, and scans the other surface of the original document in the second image scanning area. The scanning operation is later described. After that, the original document is discharged to a discharge tray 17 via the discharging rollers R10 and R11. Note that the discharging roller R11 is provided in the optical scanning section 7, not in the ADF6. On a side surface of the image scanning apparatus 2, the discharge tray 17 is held at a height lower than a height at which an original document is discharged. This allows the original document to be discharged with ease. Further, the image scanning apparatus 2 includes an original document discharging detector S6 downstream of the discharging rollers R10 and R11 in the feeding direction of the original document. The original document discharging detector S6 includes an actuator S6*a* and a sensor main body S6*b*. It is possible to check in response to the original document discharging detector S6 whether the original document is discharged or not.

The image scanning apparatus 2 sequentially repeats the aforementioned operations until no original document remains in the original document tray 22, scans the original documents one by one, and discharges sequentially the scanned original documents onto discharge tray 17.

Figure 9:
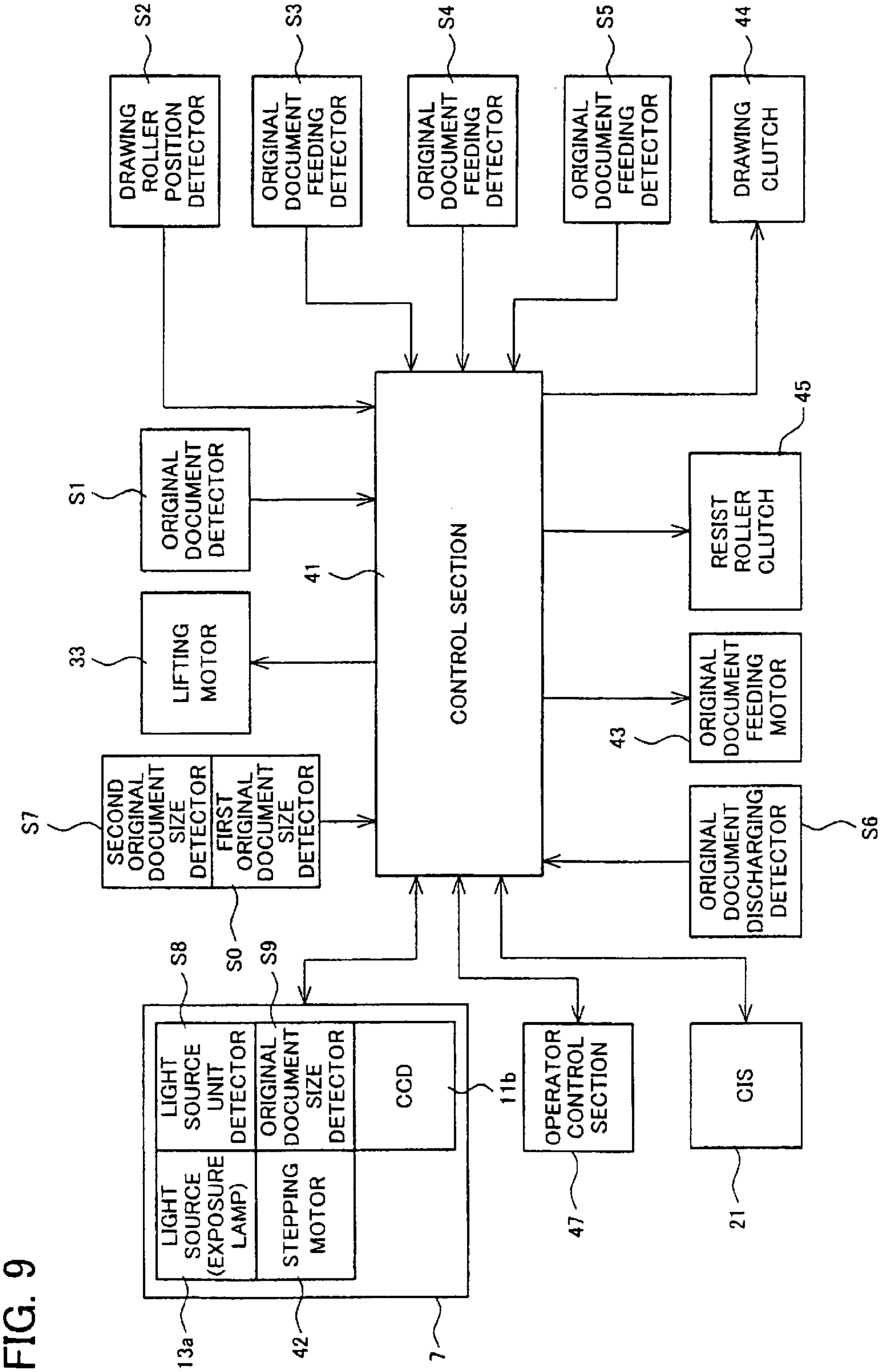
FIG. 9 is a block diagram schematically illustrating a part of the image forming system.

The respective means that the image scanning apparatus 2 includes are controlled by a control section 41 as shown in FIG. 9. The following description deals with how the control section 41 controls the respective means with reference to FIG. 9. Note that, in the present embodiment, the control section 41 is provided in the image forming apparatus 3, and the control section 41 receives information from and supplies information to the means of the image scanning apparatus 2 so as to control the respective means. That is, the control section 41 is a control section for controlling the multifunctional apparatus 1. The control section 41 is constituted by a microcomputer or the like so as to carry out various controls. Note that the control section of the multifunctional apparatus 1 is not limited to this, and a separate control section may be provided in the image scanning apparatus 2.

The image scanning apparatus 2 includes an operation section 47 as shown in FIG. 9. The operation section 47 is constituted by a liquid crystal touch panel or the like. The operation section 47 detects the user's selection, instruction or the like, and transmits it to the control section 41. The control section 41 proceeds a controlling operation in accordance with the inputted instruction or the like. For example, the control section 41 causes the operation section 47, constituted by the liquid touch panel, to display necessary information. For example, the control section 41 outputs an original document-feeding start signal to the original document tray 22 in accordance with an instruction for scanning the original document on the original document tray 22, the instruction being supplied by the user to the operation section 47.

The control section 41 controls the CIS 21 and the optical scanning section 7, both of which serve as the scanning section. Furthermore, the control section 41 stores in a memory (not shown) an image data scanned by the CIS 21 and the optical scanning section 7. A description dealing with how the control section 41 carries out the scanning will be later shown.

Further, as shown in FIG. 9, the image scanning apparatus 2 includes an original document feeding motor 43 for driving the rollers R1 through R10. The image scanning apparatus 2 further includes a drawing clutch 44, a resist roller clutch 45, and the like, respectively for transmitting driving force generated by the original document feeding motor 43 to desired rollers.

The drawing clutch 44 is provided for transmitting the driving force to the drawing roller R1 and the sorting roller R2 linked to the drawing roller R1 via a transmission section such as a belt. The resist roller clutch 45 is provided for transmitting the driving force to the resist roller R8. The image scanning apparatus 2 further includes other clutches (not shown) for driving the rollers R2, R3, R5, R6, R10, and the like.

The control section 41 engages each of the clutches so that the driving force generated by the original document feeding motor 43 is transmitted to its corresponding rollers, and disengages each of the clutches so that the driving force is blocked. For example, when a clutch for the resist roller is disengaged, the resist roller and the roller facing the resist roller stop rotating. While stopping these rollers, the original document is fed to and hit against the nip section of these rollers, thereby bending the original document. Then, the leading end of the original document is aligned with the nip section, thereby correcting the skew of the original document with respect to the feeding direction of the original document. After that, the clutch is engaged again so as to respectively roll the resist roller and the roller facing the resist roller, thereby feeding the original document.

Note that, according to the arrangement of the present embodiment, the image scanning apparatus 2 includes a single motor (driving source), and the driving force generated by the motor is transmitted to each of the rollers via the corresponding clutch. However, the present invention is not limited to this arrangement. For example, the image scanning apparatus 2 may includes a plurality of motors for the respective rollers, provided that desired feedings of the original documents can be secured by appropriately controlling the rotation speed of the motor.

The control section 41 controls based on data (detection result) acquired from the first and second original document size detector S0 and S7, the drawing roller position detector S2, the original document feeding detectors S3, S4, and 5, the original document discharging detector S6, the light source unit S8, and an original document size detector S9 shown in FIG.9. For example, based on detection results of the respective original document size detectors S0, S7, and S9, the control section 41 controls (i) the size of a sheet to be used in the image forming apparatus 3 and (ii) the timing at which the sheet should be fed. Note that the original document size detector S9 detects the size of the original document set on the original platen 12.

As described above, the control section 41 controls the respective means of the image forming apparatus 2, thereby carrying out the feeding of the original document and the image scanning.

The following description deals with how the optical scanning section 7 and the CIS 21, both of which are provided in the image scanning apparatus 2, carries out the image scanning. As described above, in the image scanning apparatus 2, it is possible to select one of the three image-scanning modes, i.e., the manual scanning mode, the single-sided automatic scanning mode, and the double-sided automatic scanning mode, respectively.

The optical scanning section 7 is used in any one of the manual scanning mode, the one-side automatic scanning mode, and the double-side automatic scanning mode. As shown in FIG. 8, the optical scanning section 7 includes the CCD scanning unit 11, the original platen 12, the light source unit 13, the mirror unit 14, and the original platen 16.

The CCD scanning unit 11 includes an image formation lens 11*a* and a CCD 11*b*. The CCD scanning unit 11 receives the light directed via the light source unit 13 and the mirror unit 14, and forms an image of the original document onto the CCD 11*b* via the image formation lens 11*a*. The image data acquired in the CCD 11*b* is stored in the memory (not shown) by the control section 41.

Note that the CCD scanning unit 11 may be arranged so that the light reflected from an original document to which the light is projected from a light source unit 13*a* is formed onto a CCD 11*b* via an image formation lens 11*a* while scanning a unit of a condensed scanning optical system (or 100% magnification scanning) in a sub-scanning direction indicated by an arrow 15. In the condensed scanning optical system, at least the image formation lens 11*a*, the CCD 11*b*, and the light source 13*a* such as an exposure lamp are contained so as to form a single unit.

The original platen 12 is made of platen glass, and is used for placing an original document such as a book thereon, and for scanning the original document. The original platen 16 is used when a sheet-like original document is scanned. The original platen 16 is provided separately from the original platen 12, i.e., is provided so as to be away, in the sub-scanning direction, from the original platen 12.

The light source unit 13 includes the light source 13*a*, a reflector 13*b*, a slit 13*c*, and a mirror 13*d*. The light source 13*a*, such as an exposure lamp, emits light toward an original document to be scanned. The reflector 13*b* is a reflecting member having a concave that collects the light for scanning-use emitted from the light source 13*a* so as to direct the light to a predetermined scanning position on the original platen 12. Only the light, which has been reflected from the original document, is allowed to pass through the slit 13*c*. The mirror 13*d* causes the direction of the light from the slit 13*c* to bend at a right angle. The mirror 13*d* is provided so that its reflection surface is at an angle of 45° with respect to a surface of the original platen 12.

The light emitted from the light source unit 13 is reflected from the original document, and is directed to the CCD scanning unit 11 by the mirror unit 14. The mirror unit 14 includes a pair of mirrors 14*a* and 14*b*. The mirrors 14*a* and 14*b* are provided so that their reflection surfaces are orthogonal to each other. With this arrangement, the light, whose traveling direction has been bent at a right angle by the mirror 13*d* of the light source unit 13, is further bent at a right angle by the mirrors 14*a* and 14*b*.

Here, the light source unit 13 is provided so as to be movable in the sub-scanning direction (the direction indicated by an arrow 15 in FIG. 8). When the image scanning apparatus 2 is in the manual scanning mode, the light source unit 13 moves in the sub-scanning direction so as to perform a scanning.

Incidentally, the ADF 6 shown in FIG. 8 is provided so as to be opened in the manual scanning mode when it is rotated upward. Specifically, the ADF 6 is provided so that an upper surface of the original platen 12 in the image scanning apparatus 2 is opened from a near side of the user. On this account, it is possible to set on the original platen 12 such an original document, such as a book or a bound original document, that cannot be fed by the ADF 6 because it does not have a sheet shape.

Therefore, in the ADF 6, a back part (a back part in a direction perpendicular to a surface of the sheet on which FIG. 8 is drawn) of the image scanning apparatus 2 is rotatably supported by the hinge 71 provided between the ADF 6 and the optical scanning section 7. The ADF 6 is arranged so as to be opened when it is rotated around the hinge 71 upward with respect to the original platen 12. In addition, an original document mat 35, made of a material having elasticity, is provided on a bottom surface (a surface facing the original platen 12) of the ADF 6.

When the original document set on the original platen 12 is scanned, the light source unit 13 moves a predetermined distance, in accordance with a size of the original document on the original platen 12, in a direction from its starting position in the manual scanning mode to a a maximum turning position of the light source unit 13. Note that the maximum turning position is a position where the light source unit 13 turns when a largest original document is scanned. Note also that the size of the original document is detected by an original document size detector (not shown).

More specifically, as shown in FIG. 8, the light source unit 13 is controlled, by the control section 41, to move in a direction (i.e., in the sub-scanning direction), indicated by an arrow 15, parallel to the surface of the original platen 12 (see reference numerals 13*e* and 13*f*). The mirror unit 14 is also controlled, by the control section 41, to move in the direction indicated by the arrow 15. Thus, the image of the original document on the original platen 12 is scanned. Note that the light source unit 13 and the mirror unit 14 move when the control section 41 controls and drives a stepping motor 42, a servo motor, or the like. During the moving, a movement speed of the mirror unit 14 is one half of that of the light source unit 13. Note also that the control section 41 controls the light source 13*a* and the CCD 11*b* in accordance with a position of the light source unit 13, the position of the light source unit 13 being detected by the light source unit detector S8.

On the other hand, when the original document is scanned in the single-sided automatic scanning mode and the double-sided automatic scanning mode, the light source unit 13 carries out the scanning while staying in the position shown in FIG. 8, and the light source unit 13 scans one side (hereinafter, referred to as an "upper side") of the original document fed on the original platen 16.

Note that, as shown in FIG. 8, based on the detection result of the light source unit detector S8 shown in FIG. 9, the light source unit 13 deems a home position to be (i) a midpoint between a position of the light source unit 13*e* and a position of the light source unit 13*f*, or (ii) a midpoint between the position of the light source unit 13 and the position of the light source unit 13*e*. Therefore, when the light source unit 13 is not used, i.e., when the light source unit is in the stand-by mode, the light source unit 13 stays in the home position.

Incidentally, the CIS 21, used when the image scanning apparatus 2 is in the double-sided automatic scanning mode, is provided so as to face the original platen 16 of the optical scanning section 7 in the ADF 6. The ADF 6 feeds the original documents stacked on the original document tray 22 one by one, and allows the CIS 21 to scan the other side (hereinafter, referred to as “back side”) of each of the original documents as described above. Note that the CIS 21 includes, for example, (i) an arrayed image sensor, (ii) an arrayed light guiding section (a lens array such as a SELFOC lens), (iii) an arrayed light source (an LED array light source or a fluorescent lamp).

The control section 41 controls the original document feeding motor 43, the drawing clutch 44, the resist roller clutch 45, or the like in accordance with detections carried out by the detectors S3 through S6. This allows the original document on the original document tray 22 to be fed. The control section 41 further controls the CCD 11*b* and the CIS 21 so that the image of the original document is scanned. The control section 41 further controls and drives, in accordance with the detection of the drawing roller position detector S2, the lifting motor 33 so that a height of the top one of the original documents stacked on the original document tray 22 is kept constant. The control section 41 carries out the operations for each original document until the original document detector S1 detects that no original document is stacked on the original document tray 22.

The following description deals with how a printing is carried out with the use of the image forming apparatus 3. The image forming apparatus 3 forms the image on a sheet supplied by the sheet supplying apparatus 4 or the like, in accordance with image data obtained by scanning an image on the original document in the image scanning apparatus 2 or image data transmitted from an external information processing apparatus.

As shown in FIG. 2, the image forming apparatus 3 of the multifunctional apparatus 1 includes the control section 41 which coordinates the respective sections to work with each other as described above. This allows an image to be formed on the sheet fed from the sheet supplying apparatus 4 to the image forming apparatus 3 in accordance with the image that has been scanned by the image scanning apparatus 2.

Further, the image forming apparatus 3 includes a paper tray 51, and a manual paper feeding tray 54 for bringing in a sheet having an arbitrary size from the outside. The sheet supplied from the paper tray 51 or the manual paper feeding tray 54 is fed, via a feeding path 56, to an image transfer area (processing area) where a photosensitive drum 59, a transcriber 62, and the like are provided. Then, the image is transferred in image transfer area. After that, the image, which has been transferred, is fixed on the sheet by a fixing apparatus 66.

The sheet supplying apparatus 4, provided under the image forming apparatus 3, includes (i) a feeding path 50 leading to the feeding path 56 of the image forming apparatus 3, and (ii) sheet cassettes 52 and 53 which can contain a large number of sheets. The sheet cassette 52 contains sheets having a different size from that contained in the sheet cassette 53.

Downstream of the fixing apparatus 66 in the sheet feeding direction, the image forming apparatus 3 further includes a switch back path 68 for forming another image on the backside of the sheet once again. The sheet is turned over in the switch back path 68, and is fed to the feeding path 56 via a double-sided unit 55. Note that the switch back path 68 and the double-side unit 55 are utilized (i) when images are formed both on the upper side and the backside of the sheet, and (ii) when the paper is discharged with the paper turned over.

The sheet, which has been fed from the paper tray 51 or the double-sided unit 55 to the feeding path 56 via the drawing rollers, is fed to the image transcription area via the feeding path 56. The sheet, which has been fed by the drawing rollers from the sheet cassettes 52 and 53 to the feeding path 50, is further fed, via the feeding paths 50 and 56, to the image transfer area by a pair of rollers provided in the feeding paths 50 and 56.

The feeding path 56 further includes a pair of rollers 58 which are provided short of the image transfer area and which serve as a resist section. On this account, the sheet is secured to be sent without a skew when the printing is carried out, and a timing at which the sheet is fed is adjusted.

Here, the process carried out in the image transfer area is described as follows. For example, the image data scanned by the image scanning apparatus 2 is sent to an image processing section (not shown) so as to be subjected to a predetermined image data processing. Then, the image data thus processed is temporarily stored in an image memory in the image processing section. In a predetermined timing, each of the stored image data is sequentially read out and sent to a laser writing unit 60 that serves as an optical writing unit.

The laser writing unit 60 includes a semiconductor laser light source, a polygon mirror, an f-θ lens, and the like. The semiconductor laser light source emits a laser beam in response to the image data sent from the image memory. The polygon mirror deflects the laser beam at a uniform angular velocity. The f-θ lens corrects and ensures the deflected laser beam to be directed onto the photosensitive drum 59 at a certain angular velocity. Note that, in the present embodiment, the laser writing unit serves as the optical writing apparatus, however, an optical writing head unit of fixed position scanning type—in the optical writing head unit, a light-emitting element array such as an LED (light emitting diode), an EL (electro luminescence) or the like are used—may be used.

Around the photosensitive drum 59, a charging device 65, a developing device 61, a transferring device 62, a discharging device 63, and a cleaning device 64 are provided. The photosensitive drum 59 is charged by the device 65 so as to have a predetermined electric potential. The developing device 61 visualizes the image by supplying a toner (developer) to an electrostatic latent image formed on the photosensitive drum 59. The transferring device 62 transfers the toner image, formed on the photosensitive drum 59, onto a sheet that has been fed to the transferring device 62. The discharging device 63 removes electric charges from the sheet on which the toner image is transferred, and detaches the sheet from the photosensitive drum 59. The cleaning device 64 collects a remaining toner after the transferring of the toner image.

The sheet is fed toward the developer image on the photosensitive drum 59 at a predetermined timing, and the developer image is transferred onto the sheet by the transferring device 62. After that, the transferred sheet is fed to the fixing apparatus 66 so that the image is fixed on the sheet, and then the sheet is discharged to outside of the image forming apparatus 3 with the use of the discharging roller 67.

Downstream of the discharging roller 67 in the sheet feeding direction, the post-process apparatus 5 is provided. The post-process apparatus 5 carries out a stapling process, a folding process, or the like with respect to the sheet on which the image is formed. The sheet fed to the post-process apparatus 5 is subjected to a predetermined post-process, and then discharged onto a lifting tray 69.

As described above, in the image scanning apparatus 2 of the present embodiment, the electric cable bundle 72, which connects the ADF 6 to the optical scanning section 7, is arranged so as to be supported by the holding section 73 of the ADF 6 and the holding section 75 of the optical scanning section 7, the holding sections 73 and 75 being provided in the direction parallel to the rotation axis 71*a* of the ADF 6. Note that the electric cable bundle 72 forms the curve section W between the holding section 73 and the holding section 75. The image scanning apparatus 2 further includes the bundling tube 70 covering the electric cable bundle 72 on the side of the multifunctional apparatus 1, which includes the image scanning apparatus 2.

On this account, the durability of the electric cable bundle 72 is improved by the reduction of the stress applied to the electric cable bundle 72. This is because the torsional stress is not concentrated but dispersed by the curve section W. It also is possible to reduce the occurrence of the bending stress occurring in the electric cable bundle 72, by providing the holding sections 73 and 75 in the direction parallel to the rotation axis 71*a*. This is because the provision of the holding sections 73 and 75 make the electric cable bundle 72 less move, while the ADF 6 rotates. Furthermore, because the torsion is absorbed by not only the curve section W but also by the holding sections 73 and 75, the stress applied to the electric cable bundle 72 is further reduced, thereby further improving the durability of the electric cable bundle 72.

Also, as described above, the present invention relates to a connection structure of electric cable bundle used for an electronic apparatus in which an apparatus that carries out an electric operation is rotatably provided with respect to the main body apparatus. Particularly, the present invention relates to (i) an image scanning apparatus which supplies and feeds an original document, and scans an image of the original document, and (ii) a connection structure of the electric cable bundle.

Figure 10:
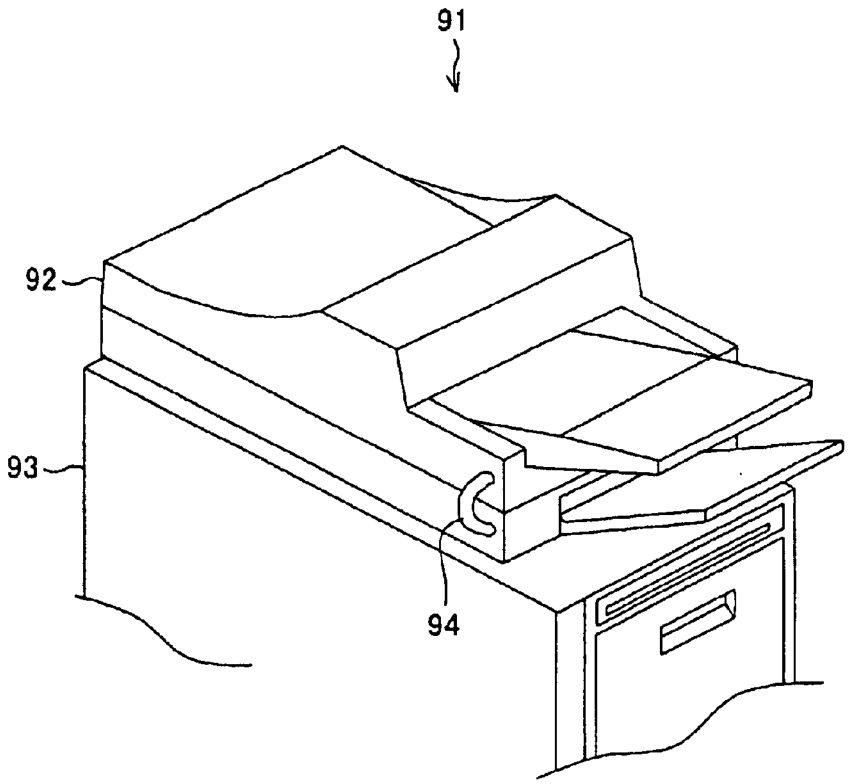
FIG. 10 is a perspective view illustrating a conventional image scanning apparatus.
Figure 11:
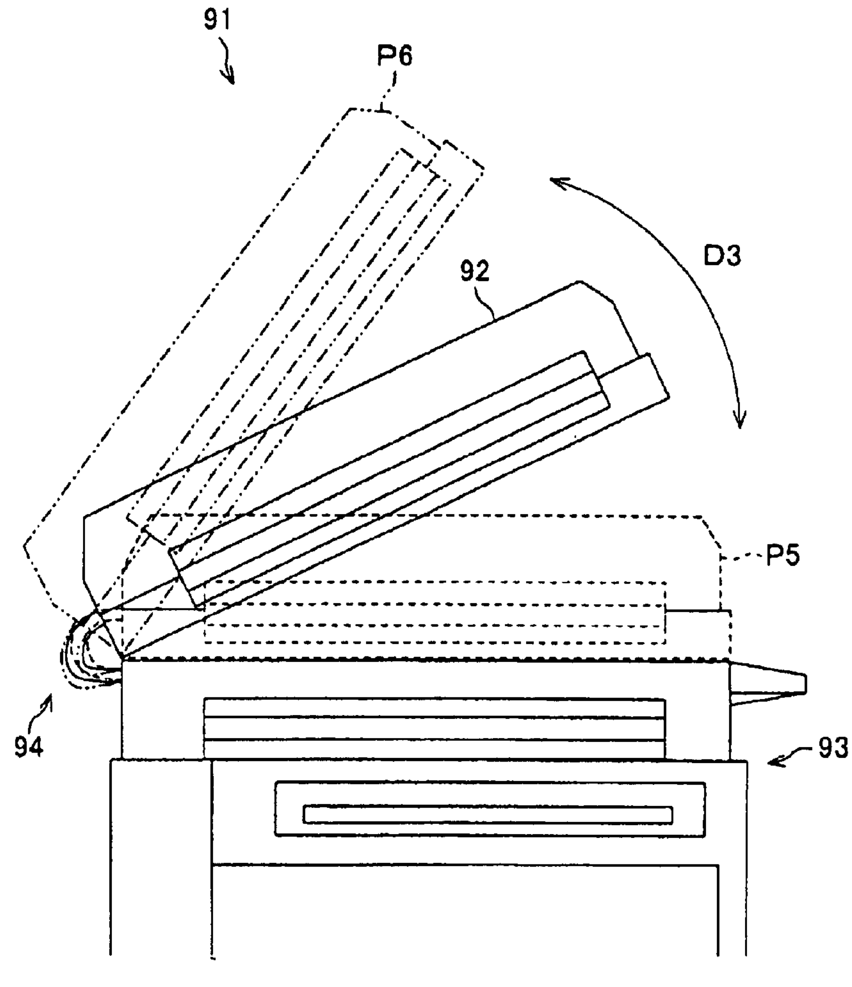
FIG. 11 is a side view illustrating the image scanning apparatus.
Figure 12:
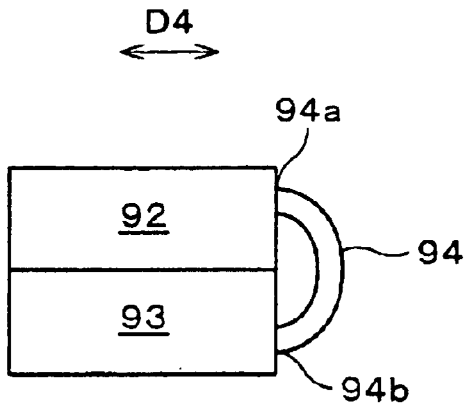
FIG. 12(*a*) is a plane view illustrating a connection structure of the image scanning apparatus.
Figure 12:
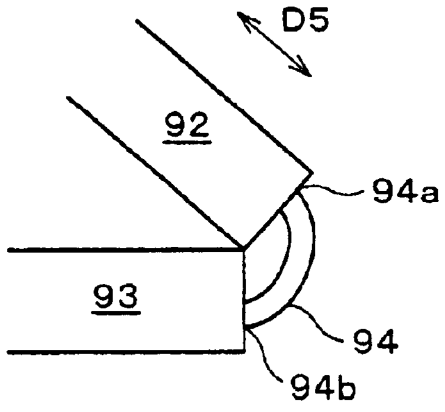

Here, a conventional connection structure is exemplified with reference to FIG. 10 through FIG. 12. As shown in FIG. 10, in a conventional copying machine 91, an ADF 92 and an optical scanning apparatus 93 are connected by a cable 94. As shown in FIG. 11, when the ADF 92 is closed, the ADF 92 is disposed in a position indicated by P5. When the ADF 92 is opened, the ADF 92 is disposed in a position indicated by P6. That is, when the ADF 92 is rotated in the direction indicated by D3, a shape of the cables 94 is changed.

More specifically, as shown in FIG. 12(*a*), when the ADF 92 is closed, a direction parallel to an imaginary line connecting an end 94*a* of the cable 94 to an end 94*b* of the cable 94 is orthogonal to the thrust direction D4 of the ADF 92.

However, as shown in FIG. 12(*b*), when the ADF 92 is opened, the direction parallel to the imaginary line connecting the edge 94*a* to the edge 94*b* is not orthogonal to the thrust direction D5 of the ADF 92.

On this account, force occurred between the ends 94*a* and 94*b* has a component in the thrust direction D5. Accordingly, the cable 94 is more easily moved in the thrust direction D5. That is, since the cable 94 moves in the thrust direction D5, the cable 94 is more easily damaged and deteriorated.

Therefore, the present invention is made to provide (i) a connection structure, of an electric cable for connecting an apparatus main body section to a rotating section, which can reduces the occurrence of the bending stress applied to an electric cable and can reduce the stress applied to the electric cable, and (ii) an image scanning apparatus having the connection structure. The connection structure is realized by providing the electric cable in the apparatus main body section and the rotating section, respectively, so that the electric cable is in a direction parallel to a rotation axis of a hinge.

Therefore, a connecting apparatus of the present invention includes: (i) a cable for electrically connecting an apparatus main body section to a rotating section which is provided so as to be rotatable around a rotation axis with respect to the apparatus main body section; (ii) a first holding section, provided in parallel to the rotation axis, which holds the cable in the apparatus main body section; and (iii) a second holding section, provided in parallel to the rotation axis, which holds the cable in the rotating section, the cable between the first and second holding sections forming a curve section.

In the connecting apparatus, the apparatus main body section is connected to the rotating section by the cable, via the first holding section of the apparatus main body, the second holding section of the rotating section, and the curve section extending to the first and second holding sections, respectively. In the respective first and second holding sections, the cable extends in parallel to the rotation axis.

Note that the cable is an electric cable, for example, (i) which is connected to a connector of the apparatus main body via the first holding section, and (ii) which is connected to a connector of the rotating section via the second holding section. Note also that the main body section and the rotating section are connected to each other by the electric cable, thereby realizing an electronic apparatus.

According to the arrangement, when a twisting occurs in the cable because of a rotation of the rotating section, the torsional stress is distributed in the curve section (section having a shape of half-loop. This avoids that the torsional stress is concentrated in a particular portion of the cable. On this account, the stress applied to the cable can be reduced, and durability of the cable can be improved.

Further, because the first and second holding sections are provided in parallel to the rotation axis, the cable is less moved during the rotating of the rotating section, thereby reducing the occurrence of the bending stress in the cable.

Furthermore, when the rotation of the rotating section causes the twisting of the cable, the first and second holding sections also lessen the twisting as the curve section does. On this account, the stress applied to the cable can be further reduced, thereby further improving the duration of the cable.

Alternatively, in the arrangement, the connecting apparatus may be such arranged that a direction parallel to an imaginary line connecting both ends of the curve section is always orthogonal to the rotation axis when the rotating section is rotated. This arrangement ensures that the force, generated in a direction parallel to an imaginary line connecting the ends of the curve section, has no component in the directions of the respective first and second holding sections. The force is generated due to a deformation of the curve section, the deformation varying in accordance with the rotating of the rotating section. Accordingly, in the first and second holding sections, no movement of the cable occurs in the thrust direction (the direction in which the cable extends), even when the curve section deforms.

The connecting apparatus may be described as a connecting structure of an electric cable in an electronic apparatus which is arranged such that an apparatus main body section is connected by an electric cable to a section that is rotatably supported by a hinge member with respect to said apparatus main body section, and the electric cable is provided in parallel to a rotation axis of the hinge member so as to be held by the apparatus main body section and the section rotated by the hinge member, respectively, and the cable has a half-loop shape.

It is preferable in the arrangement of the connecting apparatus of the present invention that (i) the first holding section includes a first supporting member which is provided to cover and support the cable, (ii) the second holding section includes a second supporting member which is provided to cover and support the cable, (iii) the first and second supporting members support the cable so as to cause friction against the cable.

According to the arrangement, the first and second supporting members cause the uniform friction in a direction parallel to a cross section of the cable. This prevents the cable from being partially damaged. Further, with the appropriate friction, it is possible to control the movement of the cable in the thrust direction. Furthermore, the torsional stress, which is caused by the rotation of the rotating section and is distributed to an area other than the curve section, is lessened or absorbed by the friction, thereby reducing the stress applied to the cable.

Further, the first and second supporting members have a two-division structure constituted by halved members. Furthermore, each of the first and second supporting members has such a curvature as to cover an outer surface of the cable. With this arrangement, it is possible to more appropriately realize the friction between the cable and the supporting members, respectively, when the torsional stress of the cable is distributed.

Note that the connecting apparatus can be described as a connection structure of an electric cable which is arranged such that (i) the cable is held by apparatus main body section and the section, via first and second holding sections, respectively, (ii) each of the first and second sections includes a supporting member having a curvature, and (iii) the cable is supported by the supporting members to such an extent that frictional force occurs between the cable and the supporting members.

Further, it is preferable in the arrangement of the connecting apparatus of the present invention, that (i) the apparatus main body section includes a first connector to which the cable is connected, (ii) the rotating section includes a second connector to which the cable is connected, (iii) at least one bundling member causes the cable between the first connector and the first holding section to be partially attached to a chassis of the apparatus main body section, and (iv) at least one bundling member causes the cable between the second connector and the second holding section to be partially attached to a chassis of the rotating section.

One of the first connector and the second connector (normally, the first connector) functions as a connector for a power supply source. The bundling members attaches (i) at least one part of the cable between the first connector and the first holding section and (ii) at least one part of the cable between the second connector and the second holding section to the chassis of the apparatus main body section and the rotating section, respectively.

According to this arrangement, the bundling members partially attach the cable to the apparatus main body section and the rotating section, respectively. Accordingly, it is not likely that the twisting to be absorbed by the first and second holding sections, or the possible movement of the cable in the thrust direction due to the twisting of the cable is transmitted to the respective first and second connectors. This allows the first and second connectors to be free from the force causing the cable to be pulled out or to be twisted.

Note that the connecting apparatus having the arrangement may be described as a connection structure of an electric cable which is arranged such that the electric cable between the supporting members and the connectors is attached by the bundling member to the apparatus main body section and the rotating section, respectively.

Further, it is preferable in the arrangement of the connecting apparatus in accordance with the present invention that the cable is an electric cable bundle of a plurality of insulating coating electric wires, and the electric cable bundle is covered with a bundling tube.

A plurality of the electric wires are thus bundled, and the bundled electric wires (electric cable bundle) are covered with the bundling tube. When the rotation of the rotating section causes the torsional stress, the frictions between the electric cable bundle and the first and second holding sections are distributed to (i) the friction between the electric cable bundle and the bundling tube, (ii) the friction between the bundling tube and the first holding section, and (iii) the friction between the bundling tube and the second holding section, respectively. On this account, it is possible to reduce the friction against the electric cable bundle.

Further, even when the cable bundle is twisted by the rotation of the rotating section, it is possible to keep an appearance of the connecting apparatus acceptable. Furthermore, when the cable bundle is attached to the first and second holding sections so that the bundling tubes respectively are held by the first and second holding sections, it is possible to avoid that the electric cable is caught by the respective supporting members or other defect, thereby easily assembling the connecting apparatus.

Note that the connecting apparatus also may be described as a connection structure of an electric cable, which is arranged so that the electric cable is an electric cable bundle bundling a plurality of insulation coating electric wires, and the electric cable bundle is further covered with the bundling tube.

It is preferable in the arrangement of the connecting apparatus in accordance with the present invention that the second holding section of the rotating section is provided in or in a vicinity of the rotation axis.

Thus, when the second holding section of the rotating section is provided, for example, adjacent to the rotation axis such as a shaft of the hinge, the second holding section less moves while the rotating section is rotated. Accordingly, the electric cable less moves, and less bending stress occurs. Alternatively, the second holding section may be provided so as to be parallel to the rotation axis.

Note that the connecting apparatus may be also described as a connection structure of an electric cable which is arranged such that at least the holding section which rotates is provided in a vicinity of the rotation axis of the hinge member.

An image scanning apparatus of the present invention may include any one of the foregoing connecting apparatuses.

For example, in the image scanning apparatus, the connecting apparatus connects an optical scanning apparatus (main body section) to an original document feeding apparatus (rotating section) provided above the optical scanning apparatus.

According to the aforementioned arrangement, with the use of the connecting apparatus in the image scanning apparatus, a stress of the electric cable is reduced, thereby avoiding a breaking of the image scanning apparatus, the breaking being caused by the electric cable. It is also possible to carry out a high quality scanning of image.

To achieve the object, an image forming system of the present invention may include the image scanning apparatus.

The foregoing arrangement secures an image forming apparatus to be hardly broken.

The present invention is not limited to the embodiments above, but may be altered within the scope of the claims. An embodiment based on a proper combination of technical means disclosed in different embodiments is encompassed in the technical scope of the present invention.

What is claimed is:

1. A connecting apparatus, comprising:

a cable for electrically connecting an apparatus main body section to a rotatable section supported by a hinge member, wherein:

the cable is provided parallel to a rotation axis of the hinge member so as to be held by the apparatus main body section and the rotatable section, respectively, and the cable is arranged to have a U shape curved section, which curved section extends beyond a periphery of the apparatus main body section when the rotatable section is in a closed position, and wherein the cable maintains the U share regardless of the position of the apparatus main body section with respect to the rotatable section during normal use.

2. The connecting apparatus as set forth in claim 1, wherein:

the cable is held by the apparatus main body section and the rotatable section, via holding sections, respectively, each of the holding sections includes a supporting member having a curvature, and the cable is held by the supporting members so that frictional force occurs between the cable and the supporting members.

3. The connecting apparatus as set forth in claim 1, wherein:

at least a the holding section holding the cable to the rotatable section is provided in a vicinity of the rotation axis of the hinge member.

4. The connecting apparatus as set forth in claim 1, wherein:

the cable is a cable bundle of a plurality of insulating coating electric wires, and the cable bundle is covered by a bundling tube.

5. The connecting apparatus of claim 2, wherein the supporting members are provided on an inner surface thereof with a rib section.

6. The connecting apparatus of claim 5, wherein the rib section allows frictional force to occur between the cable and the supporting members.

7. The connecting apparatus of claim 5, wherein the surface of the rib section has a curvature.

8. A connecting apparatus, comprising:

a cable for electrically connecting an apparatus main body section to a rotating section which is provided so as to be rotatable around a rotation axis with respect to the apparatus main body section;

a first holding section, provided in parallel to the rotation axis, which holds the cable in the apparatus main body section; and a second holding section, provided in parallel to the rotation axis, which holds the cable in the rotating section, the cable between the first and second holding sections forming a curve section, wherein at least part of the cable is provided approximately parallel to the rotation axis, and wherein the cable is arranged to have a U shape curved section, which curved section extends beyond the apparatus main body section when the rotating section is in a closed position, so that the cable maintains the U shape regardless of the position of the apparatus main body section with respect to the rotating section during normal use.

9. The connecting apparatus as set forth in claim 8, wherein:

the first holding section includes a first supporting member which is provided to cover and support the cable, the second holding section includes a second supporting member which is provided to cover and support the cable, the first and second supporting members support the cable so as to cause friction against the cable.

10. The connecting apparatus as set forth in claim 9, wherein:

each of the first and second supporting members has a two-division structure constituted by halved members.

11. The connecting apparatus as set forth in claim 9, wherein:

each of the first and second supporting members has such curvature as to cover an outer surface of the cable.

12. The connecting apparatus as set forth in claim 8, wherein:

the apparatus main body section includes a first connector to which the cable is connected, the rotating section includes a second connector to which the cable is connected, at least one bundling member causes the cable between the first connector and the first holding section to be partially attached to a chassis of the apparatus main body section, and at least one bundling member causes the cable between the second connector and the second holding section to be partially attached to a chassis of the rotating section.

13. The connecting apparatus as set forth in claim 8, wherein:

the cable is an electric cable bundle of a plurality of insulating coating electric wires, and the electric cable bundle is covered with a bundling tube.

14. The connecting apparatus as set forth in claim 8, wherein:

the second holding section of the rotating section is provided in or in a vicinity of the rotation axis.

15. An image scanning apparatus, comprising a connecting apparatus, said connecting apparatus, comprising:

a cable for electrically connecting an apparatus main body section to a rotatable section rotatably supported by a hinge member, the cable being provided in parallel to a rotation axis of the hinge member so as to be held by the apparatus main body section and the rotatable section, respectively, and the cable is arranged to have a U shape curved section, which curved section extends beyond a periphery of the apparatus main body section when the rotatable section is in a closed position, so that the cable maintains the U shape regardless of the position of the apparatus main body section with respect to the rotatable section during normal use.

16. An image scanning apparatus, comprising:

a connecting apparatus, said connecting apparatus, comprising:

a cable for electrically connecting an apparatus main body section to a rotating section which is provided so as to be rotatable around a rotation axis with respect to the apparatus main body section;

a first holding section, provided in parallel to the rotation axis, which holds the cable in the apparatus main body section; and a second holding section, provided in parallel to the rotation axis, which holds the cable in the rotating section, the cable between the first and second holding sections forming a curve section, wherein at least part of the cable is provided approximately parallel to the rotation axis, and wherein the cable is arranged to have a U shape curved section, which curved section extends beyond the apparatus main body section when the rotating section is in a closed position, so that the cable maintains the U shape regardless of the position of the apparatus main body section with respect to the rotating section during normal use.

17. The image scanning apparatus as set forth in claim 16, wherein:

the connecting apparatus connects an optical scanning section serving as the apparatus main body section to a sheet feeding apparatus serving as the rotating section.

18. An image forming system, comprising an image scanning apparatus comprising a connecting apparatus, said connecting apparatus comprising:

a cable for electrically connecting an apparatus main body section to a rotatable section rotatably supported by a hinge member, the cable being provided at least partially in parallel to a rotation axis of the hinge member so as to be held by the apparatus main body section and the rotatable section, respectively, and the cable is arranged to have a U shape curved section, which curved section extends beyond a periphery of the apparatus main body section when the rotatable section is in a closed position, so that the cable maintains the U shape regardless of the position of the apparatus main body section with respect to the rotatable section during normal use.

19. An image forming system comprising an image scanning apparatus including a connecting apparatus, said connecting apparatus comprising:

a cable for electrically connecting an apparatus main body section to a rotating section which is provided so as to be rotatable around a rotation axis with respect to the apparatus main body section;

a first holding section, provided in parallel to the rotation axis, which holds the cable in the apparatus main body section; and a second holding section, provided in parallel to the rotation axis, which holds the cable in the rotating section, the cable between the first and second holding sections forming a curve section, wherein at least part of the cable is provided approximately parallel to the rotation axis, and wherein the cable is arranged to have a U shape curved section, which curved section extends beyond the apparatus main body section when the rotating section is in a closed position, so that the cable maintains the U shape regardless of the position of the apparatus main body section with respect to the rotating section during normal use.

* * * * *